United States Patent [19]
Selstad

[11] Patent Number: 5,320,064
[45] Date of Patent: Jun. 14, 1994

[54] SMALL ANIMAL BREEDING CAGE HAVING A SOLID FLOOR NESTING SECTION AND A SCREEN FLOOR WASTE SECTION

[76] Inventor: Scott T. Selstad, 5551 Rainbow Crest Dr., Agoura Hills, Calif. 91301

[21] Appl. No.: 14,800

[22] Filed: Feb. 8, 1993

[51] Int. Cl.$^5$ .............................................. A01K 1/00
[52] U.S. Cl. ........................................ 119/17; 119/19
[58] Field of Search ............... 119/17, 19, 15, 165, 119/45.5, 50.1

[56] References Cited

U.S. PATENT DOCUMENTS

| | | | |
|---|---|---|---|
| 3,035,544 | 5/1962 | Katt, Jr. | 119/17 |
| 3,160,140 | 12/1964 | Porter | 119/18 |
| 3,246,630 | 4/1966 | Dearing et al. | 119/165 |
| 3,429,297 | 2/1969 | Schroer | 119/17 |
| 3,618,568 | 11/1971 | Breeden | 119/19 |
| 4,171,683 | 10/1979 | Godin | 119/15 |
| 4,524,721 | 6/1985 | Lanner et al. | 119/17 |
| 5,092,270 | 3/1992 | Simons et al. | 119/19 |
| 5,195,464 | 3/1993 | Mutter | 119/165 |
| 8,885,523 | 5/1975 | Coleman | 119/19 |

FOREIGN PATENT DOCUMENTS 2650902 5/1978 Fed. Rep. of Germany ........ 119/17

Primary Examiner—Gene Mancene
Assistant Examiner—Todd E. Manahan
Attorney, Agent, or Firm—Allan M. Shapiro

[57] ABSTRACT

A cage defined by walls and floor has a dividing wall thereacross dividing the floor area into two portions. Each floor portion, together with the adjacent wall portions, defines a functional section of the cage. The first floor portion is about one-half to two-thirds the total floor area. The first section has a solid floor portion to receive bedding, and the second section has a screen floor portion or bottom. The screen bottom side, i.e., the second section, is fitted to supply water and feed to the rodents. Most of the waste is deposited on the screen bottom of the second section to substantially increase the life of the bedding in the first section and provide health and economic benefits.

20 Claims, 2 Drawing Sheets

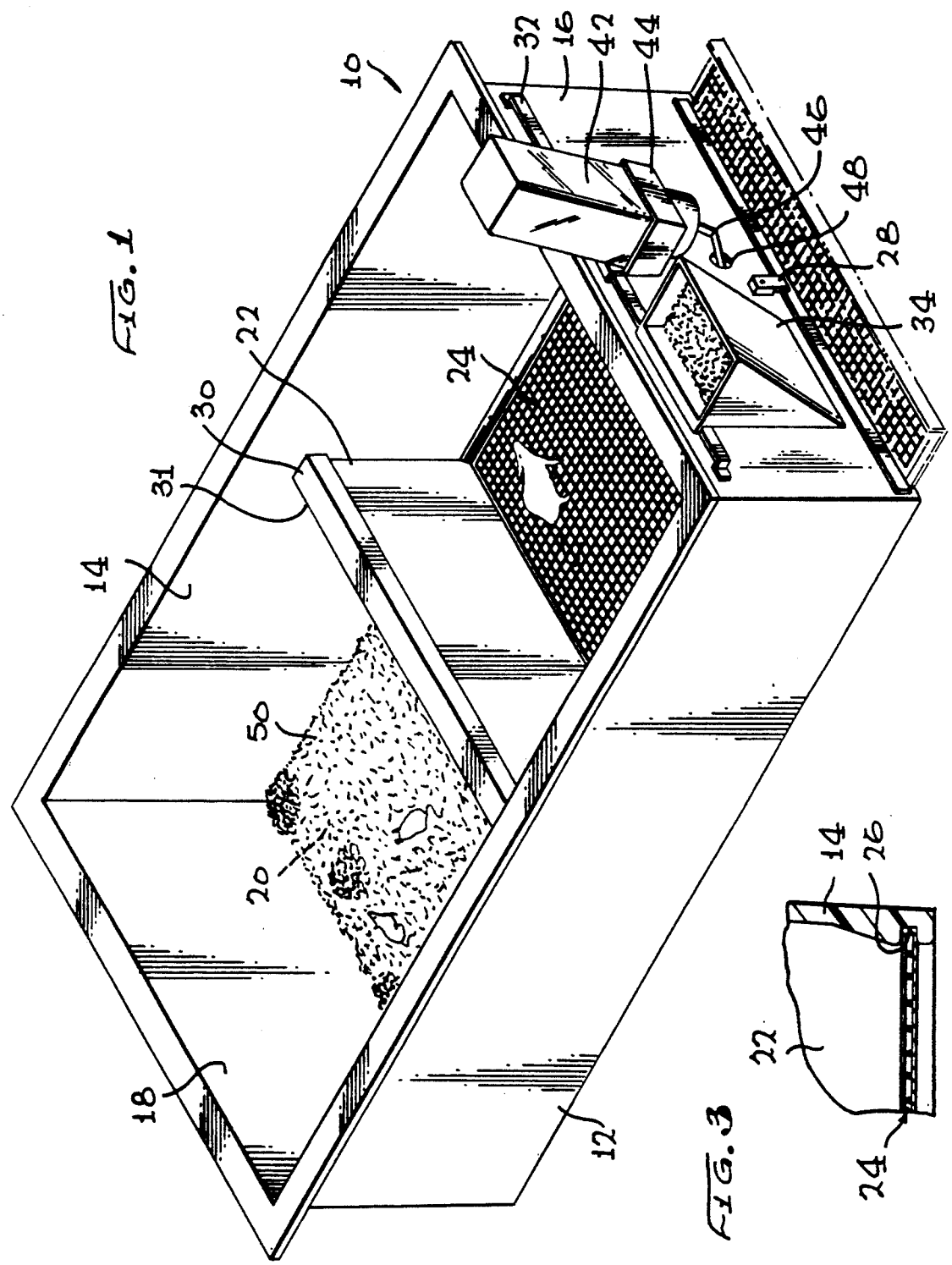

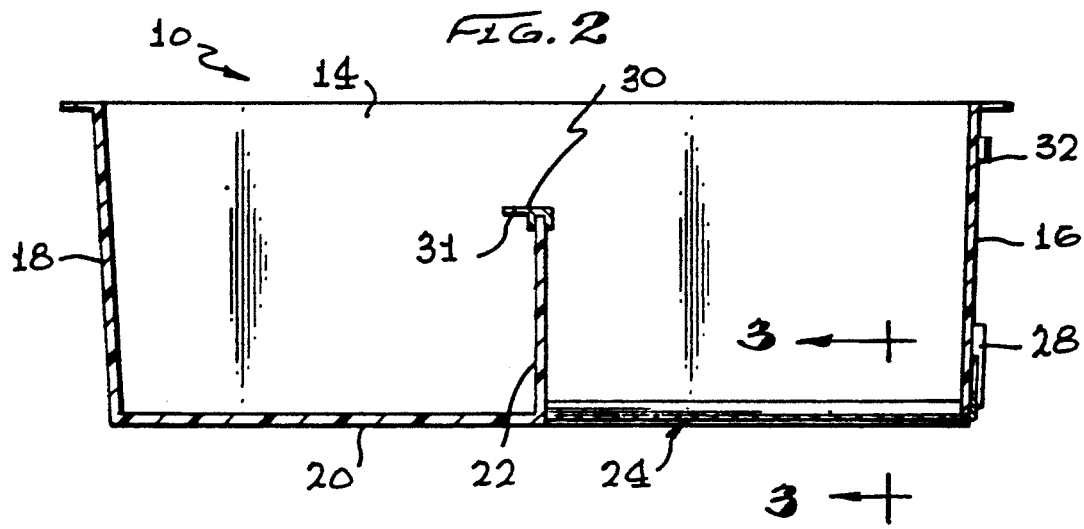
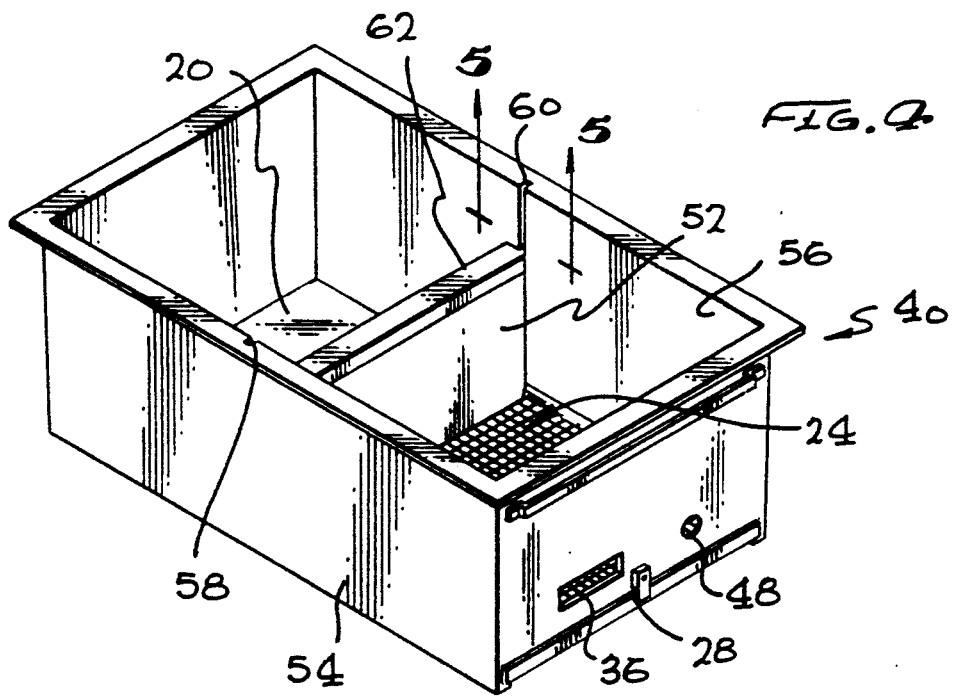
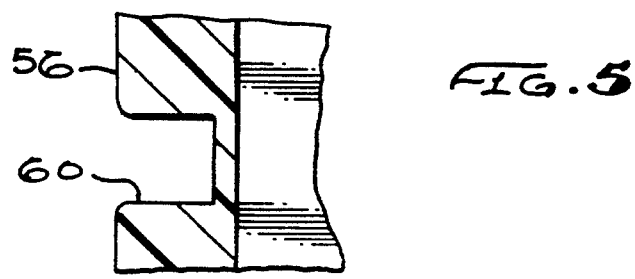

SMALL ANIMAL BREEDING CAGE HAVING A SOLID FLOOR NESTING SECTION AND A SCREEN FLOOR WASTE SECTION

FIELD OF THE INVENTION

This invention is directed to cages which are divided by an interior wall to provide a first section with a solid bottom to carry bedding and a second section with a screen bottom so that rodents bred and raised therein deposit most of their waste on the screen bottom to increase the life of the bedding and provide health and economic benefits.

BACKGROUND OF THE INVENTION

A large number of rodents is grown in the United States for various purposes. Rodents of various sizes are required for different purposes. The animals which are commercially raised and which are relevant to this invention include mice, rats, hamsters, guinea pigs and gerbils. For the purpose of the examples given in the following specification, mice are the rodents in question. The invention is useful with the other animals named and with other similar animals, providing the dimensions are proportionately scaled to the animals' size.

The rodents are raised for various purposes. A large number are raised for medical research. Rodents of various types can be purchased with varying physical and genetic characteristics so that they are useful in medical research and development. Other rodents are grown as food for other animals. For example, mice are the preferred food for many snakes.

The raising of rodents has become quite standardized. A rectangular box or cage with solid sides and solid bottom is used for breeding, growing and supplying laboratory quality rodents, including mice. The typical mouse breeding and initial growing cage has a solid bottom which is 20 inches long by 12 inches wide and has solid walls therearound which are 6 inches high. The mice require bedding for breeding and nesting. Thus, bedding is placed in the cage. The bedding is preferably sterilized byproduct material, such as chopped newspaper or ground bark. One male and four to five female mice are placed in the cage. Food and water are supplied by dispensers to the mice in the cage. Modern rodents are bred for large litters and high growth rates. Consequently, there is an enormous amount of food and water consumed together with the deposit of correspondingly enormous quantities of solid and liquid waste. The accumulation of waste is such that the cage must be cleaned approximately every six days. Otherwise, ammonia levels become too high for the health of the animals. As a result, while the old cage is removed, cleaned and sterilized, the animals must be removed and placed in a new cage with new bedding or, alternatively, removed and held in temporary containers until the old cage has been restored to a habitable condition. This removal of the animals destroys their nesting sites and upsets their routine behavior. Upsetting routine behavior delays their growth and reproduction as well as exposing them to increased physical and health hazards.

The current belief in the industry and art is that rodents cannot be bred in a cage having a screen bottom. This is because the bedding would fall through the screen, and the females would not breed unless they have nesting opportunity. Furthermore, if they did give birth in the screen bottom cage, the infants would fall through the screen bottom and be lost. For these reasons, the industry requires solid bottom cages for the breeding, gestating, birthing and initial growing of such animals, including rats and mice, and then uses all-screen bottom cages for adult rodents only.

In order to maintain health, the cages must be cleaned and sterilized before reuse. In addition, new sterile bedding or recycled sterile bedding must be supplied. The handling, removal and return of the animals and the cleaning and reusing of the old cage is very labor-intensive because it must be performed regularly, about every six days, in accordance with present practice. Accordingly, there is a need for a system which provides sufficiently clean living conditions for the rodents, together with a reduced amount of maintenance labor.

SUMMARY OF THE INVENTION

In order to aid in the understanding of this invention, it can be stated in essentially summary form that it is directed to cages for breeding rodents or like wherein the cage is defined by walls and a floor. A first section of the floor is solid, and second section is mesh, together with a low barrier preferably separating the solid floor from the mesh floor so that bedding can be placed on the solid floor and food and water can be supplied on the mesh side so that animals therein can breed, gestate and give birth to babies on the solid floor with bedding and can eat, take water and deposit waste on the screen mesh floor to result in a longer period before the bedding must be changed.

It is thus an object and advantage of this invention to provide cages for breeding rodents or the like wherein the nesting section thereof is separated from the feeding section thereof, together with providing a mesh or screen floor on the feeding side so that the principal amount of waste deposited by rodents living in the cages will be deposited on the mesh side so that fouling of the bedding is reduced.

It is another object and advantage of this invention to provide cages for breeding rodents or the like wherein the nesting environment is improved by separating the feeding and watering section from the nesting environment and providing a mesh floor in the feeding and watering section so that most of the waste deposited by the rodents in the cages is deposited on the screen side so as to lengthen the time periods between changing of the bedding.

It is another object and advantage of this invention to provide cages for breeding rodents or the like wherein the amount of labor for cleaning the cages is reduced so as to conserve maintenance time, and the breeding and growing area is of enhanced quality so that breeding and growing production of quality rodents is more easily and more economically achieved.

It is a further object and advantage of this invention to provide cages for breeding rodents or the like which provide both a solid bottom cage section for bedding and a screen bottom section for feeding and depositing waste so that a unitary cage having different functions on different sections of its floor is achieved.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is an isometric view of a preferred embodiment of a cage for breeding rodents or like.

FIG. 2 is a longitudinal section therethrough.

FIG. 3 is an enlarged section, with parts broken away, taken generally along line 3—3 of FIG. 2.

FIG. 4 is an isometric view of a second preferred embodiment of the cage for breeding rodents or the like.

FIG. 5 is an enlarged section taken generally along line 5—5 of FIG. 4, with parts broken away.

DESCRIPTION OF THE PREFERRED EMBODIMENTS

The first preferred embodiment of the cage for breeding rodents or the like is generally indicated at 10 in FIGS. 1 and 2. The cage 10 is illustrated as being rectangular, which is convenient for grouping several together. The cage 10 is defined by left and right side walls 12 and 14, front wall 16 and back wall 18. The cage further includes solid bottom 20. The solid bottom 20 extends from about one-half to about two-thirds the distance from back wall 18 to front wall 16. Cross wall 22 extends between the side walls at the front of the solid bottom 20. These walls and solid bottom 20 are preferably integrally molded of a suitable synthetic polymer composition material. If visibility is desired, polycarbonate is a suitable synthetic material because of its resistance to the higher temperatures required for cleaning.

The mesh bottom 24 extends from wall to wall forward of the cross wall 22. As seen in FIG. 3, wall 14 has a guide slot 26 formed therein. The near wall 12 has a similar guide slot. Furthermore, the front wall 16 is open below the top of the guide slots so that the mesh bottom 24 may be slid into place and retained in place, as by latch 28, see FIG. 1. When fully inserted, mesh bottom 24 extends all the way back to cross wall 22. When sized for mice, the cage is about 6 inches high, 20 inches long and 12 inches wide. The cross wall 22 serves as a barrier to the loss of bedding and is about 4 inches high. The top of cross wall 22 carries flange 30, which embraces the top of the cross wall and which has its flange extending toward the solid bottom section. The flange 30 is made of metal to prevent the rodents in the cage from chewing on either the flange 30 or the top of the cross wall 22. The flange 30 has a lip 31 directed toward the solid bottom side of the cross wall in order to aid in the prevention of bedding from being tossed over the cross wall. A suitable cover is provided for the top of the cage 10 to prevent escape of the mice.

Front wall 16 has a rail 32 thereon. Food hopper 34 hangs on the rail 32 and extends through food opening 36 seen in the second preferred embodiment of the cage of this invention, which is generally indicated at 40 in FIG. 4. In addition, water bottle 42 is inverted in water trough 44, which has a spout 46 extending through water spout opening 48 in the front wall 16 of cage 10. Thus, the food and water are delivered to the rodents in the cage at the end of the cage having the mesh bottom 24.

The cage 10 is utilized by placing bedding 50 into the solid bottom end of the cage behind cross wall 22. In the example given, mice are installed in the cage. The mice comprise one male and four or five female mice. After mating with the male, the females form nests in the bedding in the solid bottom end of the cage. The male and females jump or crawl over the cross wall 22 to obtain food and water. It is instinctive among rodents to deposit their waste far away from their nests. In addition, the providing of the food and water at the mesh bottom end of the cage reinforces this instinct. As a result, most of the waste deposited by the adult mice is deposited at the mesh bottom end of the cage. This substantially reduces fouling of the bedding.

Present-day laboratory rodents are bred for large number of offspring. It is common for such mice to have a litter of twelve babies. Quite often, the females communally care for their offspring. The baby mice nurse on any available mother, and the females permit this. This means that the females can freely jump over the cross wall 22 for access to food and water. As far as the adult mice are concerned, it is common for over three-quarters of their waste to be deposited on the mesh bottom side of the cross wall when this cage 10 is employed. However, the waste deposited by the baby mice is necessarily in the bedding. As a result, even by eliminating most of the adult mouse waste from the bedding, the bedding must still be changed. In the prior system, a solid bottom cage with bedding needed to be cleaned every six days because the ammonia level became too high for health of the mice and, incidentally, for the cleaning personnel. The removal of the mice for cage cleaning and changing was detrimental to their nesting. Since the large majority of the waste is deposited through the mesh of cage 10, water-washed trays beneath the mesh can carry off the waste to remove its ammonia generation from the room in which the cages are located. Atmospheric ammonia in the breeding houses is very much reduced, and the nest side stays much dryer. The reduced cleaning requirements decrease the times the nest is disturbed, and the reduced of ammonia in the air both enhance the health conditions.

While the size of the cage is defined for mice, it is understood that the cage is also useful for other rodents and other similar animals, but the size of the cage must be scaled up in proportion to the size of the rodents or animals in question.

The inventive cage 40 for breeding rodents or the like, illustrated in FIG. 4, has most of the same components as the cage 10. The difference is that the cross wall 52 is removable to aid in cleaning of the cage. Left and right side walls 54 and 56, respectively, have guide slots 58 and 60 therein. Guide slot 60 is shown in more detail in FIG. 5. The cross wall 52 is a rectangular polymer panel, preferably of the same material as the rest of the cage walls, and has a thickness such as to permit it to slide freely in and out of the guide slots 58 and 60. The guide slots position the cross wall 52 at the end of the solid bottom 20 so that there is no gap at the end of the solid bottom 20. The cross wall 52 is also provided with a metal flange 62 of the same shape as flange 30 in order to prevent the rodents from gnawing on the top edge of the cross wall and to resist the transfer of bedding across the wall. Thus, cage 40 functions in a very similar way to the cage 10, but permits the cross wall 52 to be removed for cage cleaning.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A cage for breeding small animals, comprising:

a container having a bottom and walls defining the sides of said cage, said walls having a first height for receiving a cover for said container, a first portion of said bottom being solid to receive bedding and a second portion of said bottom having openings therethrough to the exterior below said second portion to permit waste to fall therethrough; and a cross wall extending across said bottom between said first and second portions thereof, said cross wall joining said side walls, said cross wall being sufficiently solid so that a small animal cannot pass therethrough and having a second height less than said first height so as to be sufficiently low so that an adult small animal in said cage can pass over said cross wall.

2. The cage of claim 1 wherein said second portion of said floor is a mesh bottom.

3. The cage of claim 2 wherein there is means on said cage for the attachment of means to supply food and water, said means for attachment being positioned with respect to said second portion of said cage bottom such that an animal in said cage partaking of said means to supply food and water is on the same side of said crosswall as said second portion of said bottom.

4. The cage of claim 3 wherein said first portion of said cage bottom comprises from about one-half to about two-thirds of said cage bottom.

5. The cage of claim 4 wherein said cage walls have a guide slot therein and said mesh bottom of said second portion of said cage bottom is positioned within said guide slot.

6. The cage of claim 5 wherein said mesh portion of said cage bottom is removable from said guide slot.

7. The cage of claim 6 wherein said walls and said first portion of said bottom are unitarily molded of synthetic polymer composition material.

8. The cage of claim 7 wherein said second portion of said cage bottom is formed of metal mesh.

9. The cage of claim 1 wherein said walls and said first portion of said bottom are unitarily molded of synthetic polymer composition material.

10. The cage of claim 9 wherein said second portion of said cage bottom is formed of metal mesh.

11. A cage for breeding small animals, comprising:

left and right side walls joined together with front and back walls to define a rectangular cage space, said walls having a first height for receiving a cover;

a bottom secured to said walls to define a cage bottom, a first portion of said bottom being a solid bottom to receive bedding and joined to said left and right side walls and said back wall to define a first portion of said cage bottom, a second perforated bottom portion joining said left and right side walls and said front wall and lying adjacent said solid bottom to define a second portion of said cage bottom, said second perforated bottom portion having small enough perforations to support an adult small animal and large enough perforations to permit a significant amount of small animal waste to fall therethrough; and a cross wall extending from said left side wall to said right side wall and adjoining both said first solid bottom portion and said second perforated bottom portion to separate said cage into first and second sections, respectively, so that bedding can be placed in said first section with said solid bottom and food and water can be placed in said second section, said cross wall being sufficiently solid so that a small animal cannot pass therethrough and having a second height less than said first height so as to be sufficiently low so that small animals can nest in said first section and cross over said cross wall to eat, drink and deposit waste in said second section to reduce waste in the bedding.

12. The cage of claim 11 wherein said left and right side walls have guide slots therein and said perforated bottom is positioned in said guide slots so that said perforated bottom can be removed.

13. The cage of claim 12 wherein said perforated bottom is a metal mesh bottom.

14. The cage of claim 13 wherein said front wall carries a latch for releasably retaining said mesh bottom portion.

15. The cage of claim 11 wherein said walls, said cross wall and said solid bottom portion are integrally molded of synthetic polymer composition material.

16. The cage of claim 15 wherein a metal flange is secured to the top of said cross wall to inhibit rodent damage thereto.

17. The cage of claim 11 wherein said side walls, said front and back walls and said solid bottom portion are integrally molded of synthetic polymer composition material and said left and right side walls have guide slots therein, said cross wall being slidably mounted in said guide slots so that said cross wall is removable.

18. The cage of claim 17 wherein a metal flange is secured to the top of said cross wall to inhibit rodent damage thereto.

19. The cage of claim 11 wherein attachment means is provided on said cage for the attachment of food and water dispensers to dispense food and water into said second section of said cage.

20. The cage of claim 19 wherein said attachment means comprises a rail attached to said front wall together with openings in said front wall so that food and water dispensers may be hung on said rail and dispense food and water through said openings in said front wall.

* * * * *